United States Patent [19]
Case

[11] 3,928,955
[45] Dec. 30, 1975

[54] DOUBLE WINDROWING METHOD AND APPARATUS
[75] Inventor: Cecil L. Case, Newton, Kans.
[73] Assignee: Hesston Corporation, Hesston, Kans.
[22] Filed: May 6, 1974
[21] Appl. No.: 467,458

[52] U.S. Cl. .................................. 56/1; 56/DIG. 1
[51] Int. Cl.² .......................................... A01D 91/00
[58] Field of Search ....... 56/1, 370, DIG. 1, DIG. 2, 56/192

[56] References Cited
UNITED STATES PATENTS
| | | | |
|---|---|---|---|
| 2,609,651 | 9/1952 | Cymara | 56/370 |
| 2,667,731 | 2/1954 | Nerness | 56/372 |
| 2,918,774 | 12/1959 | McCarty | 56/DIG. 1 |

*Primary Examiner*—Russell R. Kinsey
*Attorney, Agent, or Firm*—Schmidt, Johnson, Hovey & Williams

[57] ABSTRACT

A double windrow attachment for self-propelled or pull-type windrowing machines receives crop which has been projected rearwardly from conditioning apparatus of the machine and transfers the crop obliquely to one side of the path of travel of the machine without discontinuing the rearward momentum of the crop. The oblique orientation of the attachment encourages the crop to flow smoothly in a steady stream from the conditioning apparatus to the discharge end of the attachment without bunching as it lands on the attachment, all of which produces a windrow of uniform density to promote rapid and proper curing of the windrowed crop. Successive passes in opposite directions through the standing crop produces a double windrow which can be readily handled by subsequent crop handling equipment, such as stack-forming machines. An improved conveyor of the attachment enables the crop to be transferred laterally at high speeds such that the windrowing operation can be carried out more rapidly than heretofore possible.

9 Claims, 6 Drawing Figures

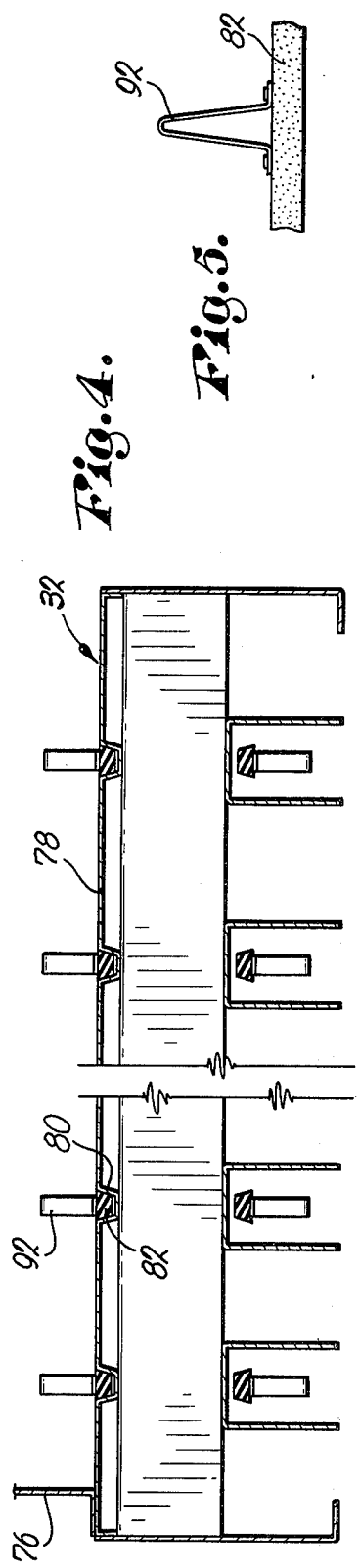
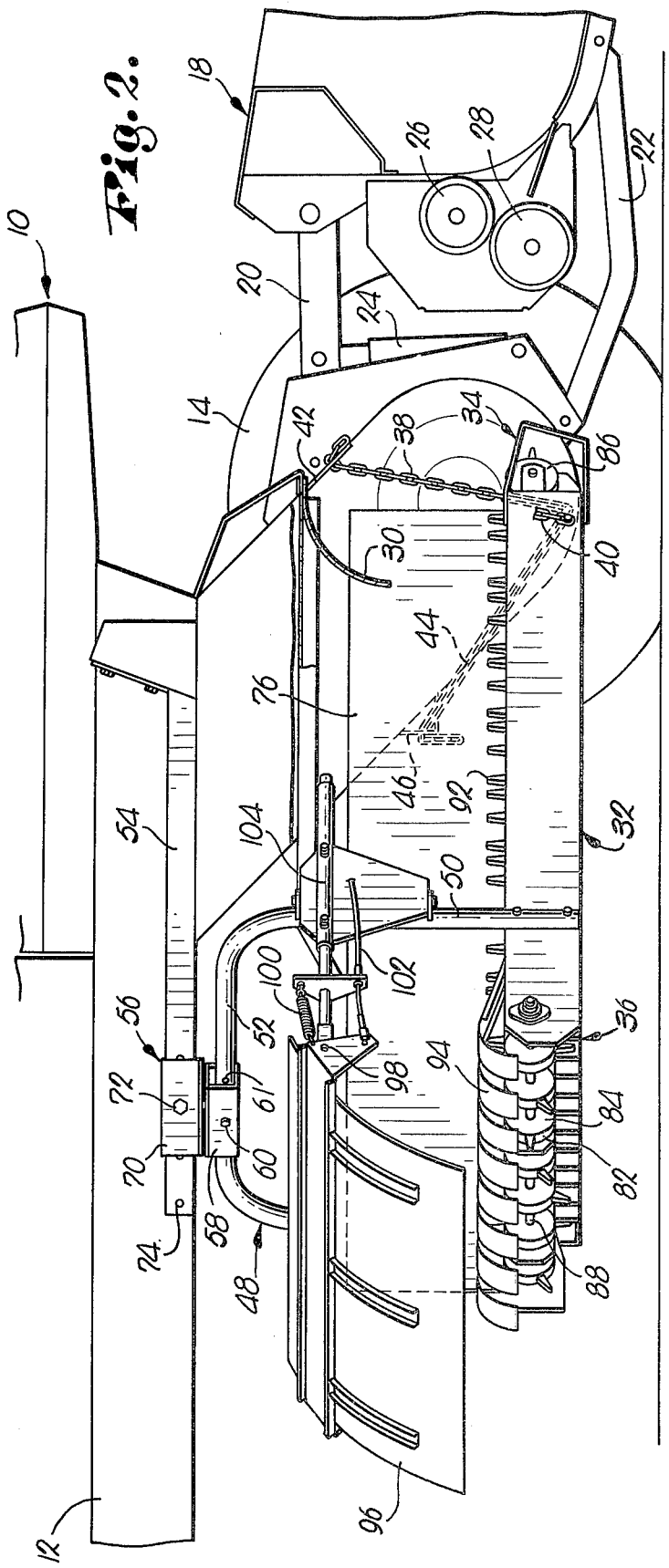

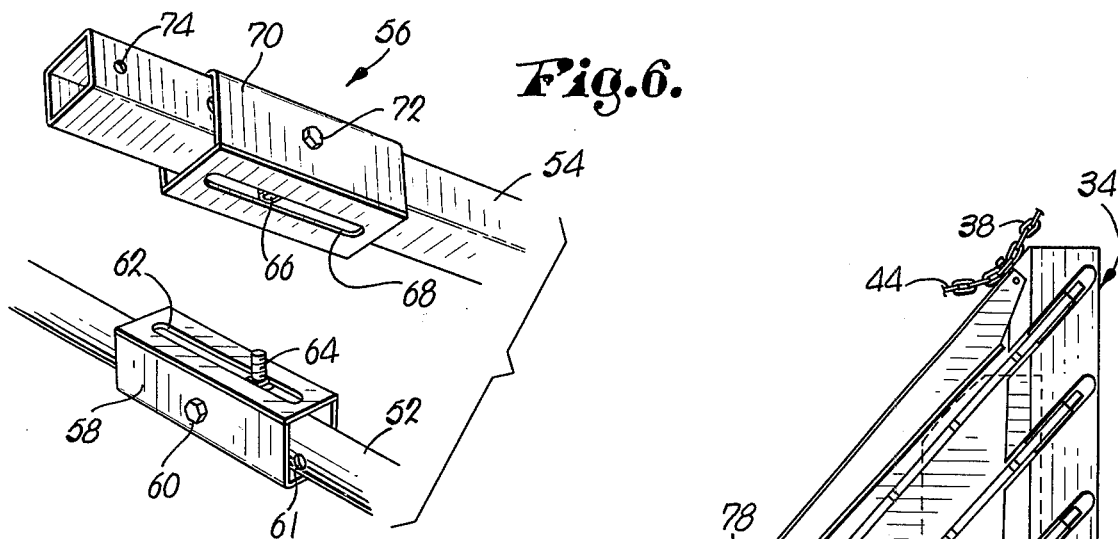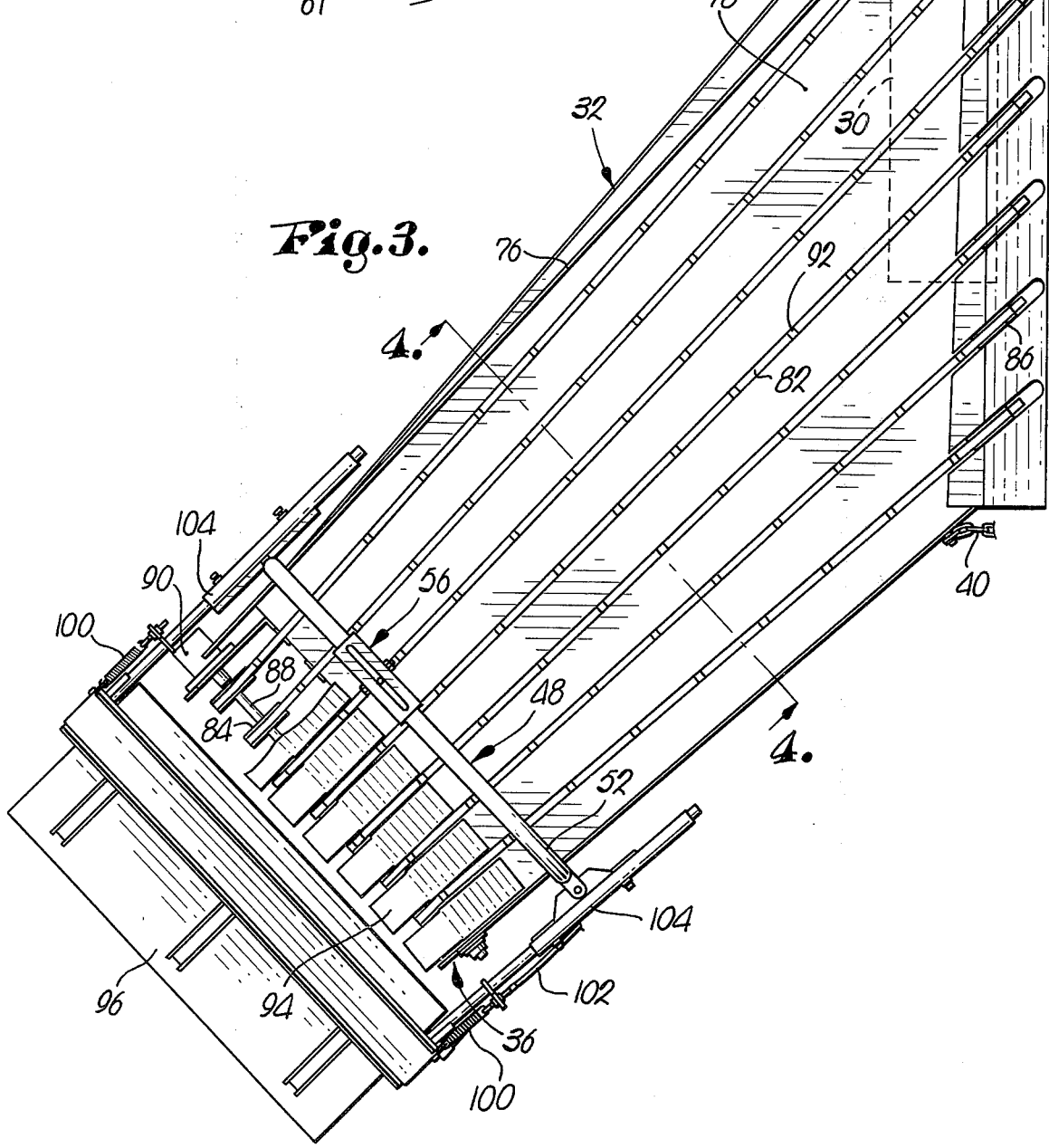

DOUBLE WINDROWING METHOD AND APPARATUS

This invention relates to the practice of advancing back and forth in successive passes across a field of standing or previously mowed crop in order to form "double" windrows produced during each successive pair of passes. Double windrowing is, of course, not new per se. However, this procedure has often been less than totally satisfactory in the past because the conveyor for receiving and transferring the conditioned crop laterally to one side of the path of travel of the implement was disposed substantially perpendicular to such path of travel. Hence, as the crop issued rearwardly from the conditioning apparatus and landed on the transversely moving conveyor, it was forced to immediately come to an abrupt halt before subsequently being re-accelerated at right angles to its initial rearward flow. This caused considerable bunching of the crop at its point of impact with the conveyor, forcing the crop to be discharged irregularly in bunches and wads instead of flowing smoothly and uniformly to produce a well-shaped windrow.

It has now been discovered that by transferring the conditioned crop obliquely rather than at right angles to its initial rearward projection, the undesirable bunching which was characteristic of earlier double windrowing procedures can be virtually eliminated because of the fact that movement of the crop is continuous from conditioning to discharge as a windrow. By utilizing the inherent rearward momentum of the conditioned crop rather than overcoming such momentum so the crop may be moved at right angles, the flow of the crop from the conditioning apparatus onto and along the obliquely disposed conveyor is smooth and uniform to the end that windrows having the optimum characteristics for curing and subsequent pickup can be produced.

Accordingly, it is one important object of the present invention to provide a double windrowing method and apparatus which overcome the shortcomings of previous double windrowing means with regard to the production of double windrows having optimum curing and pickup characteristics.

Pursuant to the foregoing, it is another important object of this invention to transfer the conditioned crop obliquely following its rearward projection from conditioning apparatus rather than at right angles to such projection in order to take advantage of the inherent rearward momentum of the projected crop instead of struggling to overcome such momentum.

An additional important object of the present invention is the provision of means for adjusting the oblique disposition of the crop transferring conveyor in order to vary the extent to which the discharge end of the conveyor projects beyond the chassis of the implement, thus making a conveyor of a single length usable on implements having headers of several different widths.

A further important object of this invention is to provide for transfer of the conditioned crop laterally at higher speeds than heretofore possible by virtue of improved conveyor means, thereby permitting the windrowing process to be carried out more rapidly than previously possible.

Yet another important object of this invention is the provision of double windrowing apparatus as aforesaid which is in the nature of "add-on" equipment that can be installed as an attachment to existing windrowing machines without major adaptation thereof.

In the drawing:

FIG. 2 is an enlarged, fragmentary side elevational view of the implement and attachment;

FIG. 3 is an enlarged, top plan view of the attachment;

FIG. 4 is an enlarged, fragmentary cross-sectional view through the attachment taken along line 4—4 of FIG. 3;

FIG. 5 is an enlarged, fragmentary detail view of a conveying belt and lug therefor; and FIG. 6 is an exploded perspective view of means providing adjustable support for the outer discharge end of the attachment.

Figure 1:
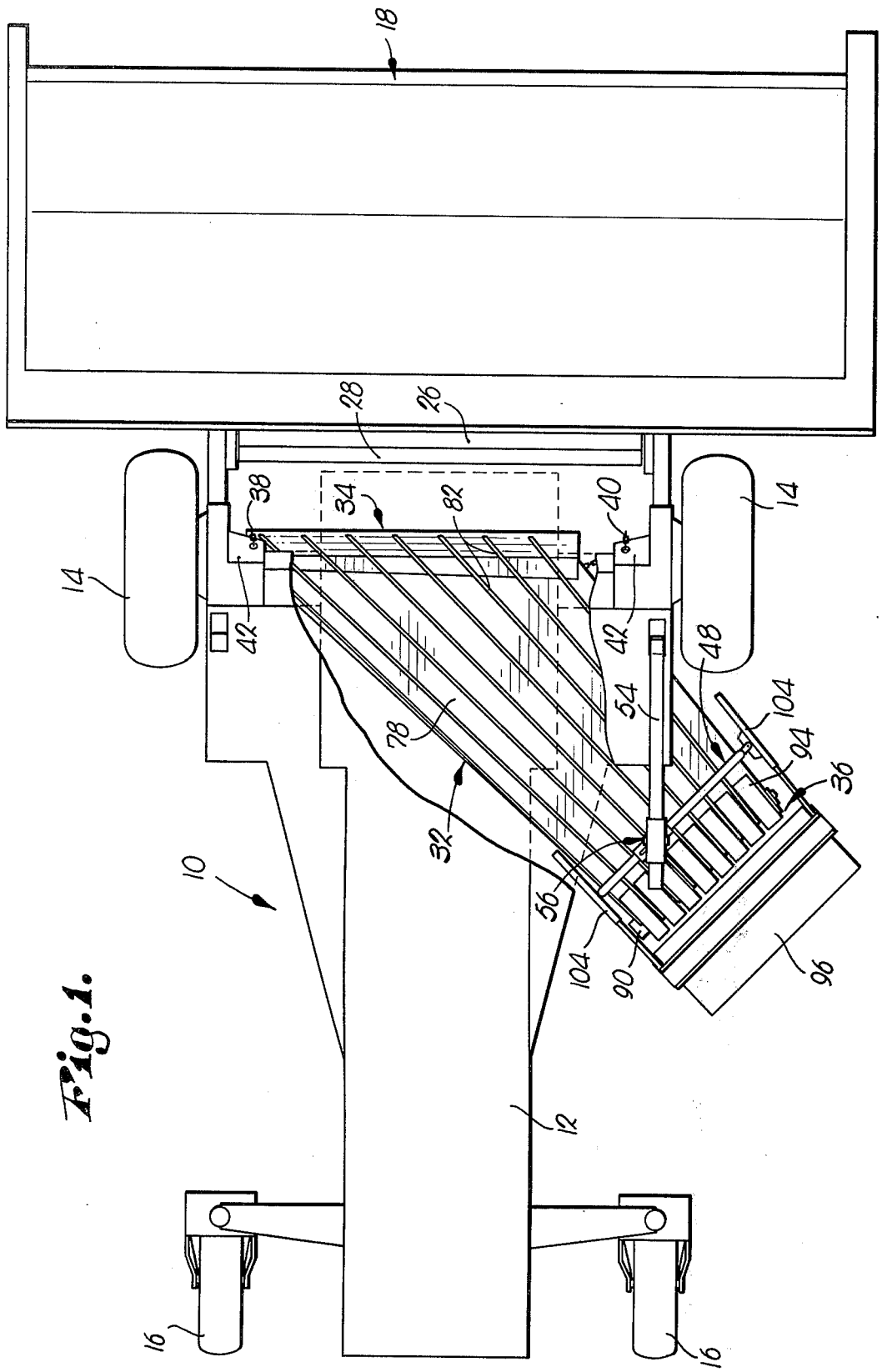
FIG. 1 is a schematic, top plan view of an implement employing a double windrowing attachment pursuant to the principles of the present invention, portions of the implement being broken away to reveal the attachment therebelow.

The implement 10 illustrated in FIGS. 1 and 2 is of the self-propelled type, although it is to be recognized that the principles of the present invention are equally applicable to pull-type implements. The implement 10 has a main chassis 12 provided with a pair of drive wheels 14 at the forward end of chassis 12 and a pair of caster wheels 16 at the rear end of chassis 12. A header 18 is swingably mounted at the front of chassis 12 by upper and lower links 20 and 22 respectively, there being one or more piston and cylinder units 24 interconnecting chassis 12 and the upper links 20 for powered raising and lowering of header 18.

Although not shown, it will be understood that header 18 may be provided with a sickle reciprocating transversely of the path of travel of implement 10 for severing a standing crop of hay or the like as implement 10 is advanced, a reel overlying the sickle for sweeping the standing crop into the sickle and the severed crop rearwardly therefrom, and a cross auger or the the like for gathering the severed crop laterally toward the center of header 18 for passage between a pair of superimposed conditioning rolls 26 and 28 across the rear of header 18. It is not essential, of course, that the header 18 be provided both with means for severing a standing crop and conditioning the same. It is quite possible that the mowing or severing step could be carried out in a separate process with other equipment preceding the advancement across the field of implement 10 to pick up the severed crop, gather the same medially, and move it through the conditioning rolls 26 and 28. In either situation, the crop is raised from the field for delivery rearwardly to the conditioning rolls 26 and 28, whether such raising is simultaneous with severance or is carried out subsequently with appropriate pickup means.

As the crop is conditioned by rolls 26 and 28, it is projected rearwardly through space parallel to the path of advancement of implement 10. An overhead, downwardly concave deflector 30 extends partially across the path of projection of the crop to engage the latter in mid-flight and direct the same downwardly onto and across lateral crop transfer structure in the nature of a conveyor 32. The conveyor 32 is obliquely disposed with respect to the path of projection of crop from conditioning rolls 26 and 28 and also to the path of advancement of implement 10, having its forward receiving end 34 disposed between the front drive wheels 14 a short distance rearwardly from rolls 26 and 28 and its rearward discharge end 36 behind the right drive wheel 14 (viewing FIG. 1) and outboard thereof.

The receiving end 34 of conveyor 32 is floatingly supported by a pair of flexible suspension chains 38 and 40 at opposite lateral corners thereof that have their upper ends releasably inserted into receiving notches on gussets 42 of chassis 12. A third stabilizing chain 44 extends rearwardly and upwardly from the point of attachment of chain 38 to conveyor 32 for releasable insertion into a similar notch on an L-shaped gusset member 46 on chassis 12 rearwardly of the left gusset 42. By virtue of the releasable reception of the chains 38, 40 and 44 within gussets 42 and 46, the height of the front end of conveyor 32 can be readily adjusted, and yet floating support is provided to positively limit downward movement of receiving end 34 while permitting the same to ride easily up and over mounds or other obstructions that may be passed over by implement 10.

Discharge end 36 has a more rigid connection to chassis 12 made through an inverted U-shaped member 48 having its legs 50 straddling the conveyor 32 and fixed at their lower ends to the latter, while the upper bight 52 of member 48 is shiftably coupled to a fore-and-aft extending support arm 54 of chassis 12 through adjustment assembly 56.

The purpose of assembly 56 is to enable discharge end 36 to be adjustably swung toward or away from chassis 12 in order to change the oblique disposition of conveyor 32. Such is important inasmuch as discharge end 36 should be disposed slightly inside of the swath taken by header 18 and yet outside of the right trailing wheel 16 so that the windrow is deposited between standing crop yet to be severed and the trailing right wheel 16. Projection of discharge end 36 too far laterally from chassis 12 will result in the windrow being deposited within standing crop, while location of end 36 too close to the chassis 12 will result in the windrow being run over by the right trailing wheel 16. Moreover, since header 18 may be of several different widths, and it is desired to utilize but one length of conveyor 32 for purposes of simplicity, end 36 must be positioned closer in or further out depending upon the width of header 18 selected for use.

The adjustment assembly 56 is illustrated in detail in FIG. 6 and includes a first rectangular tubular collar 58 that is adjustably slidable along bight 52 of member 48. A cross bolt 60, inserted into one of a number of holes 61 through bight 52, releasably holds the collar 58 in a selected position along bight 52. The upper surface of collar 58 is provided with an elongated slot 62 which permits free travel therewithin of an upright bolt 64 having a nut 66 that is disposed behind a longitudinal slot 68 in a second rectangular collar 70 slidable along arm 54. Collar 70 is in turn releasably held in a selected position along arm 54 by a cross bolt 72 extending through an appropriate one of a number of holes 74 along arm 54. The connection between collars 70 and 58, made by the bolt and nut 64 and 66 is maintained fairly loose so that, upon removal of the cross bolts 60 and 72, the collars 58 and 70 may be shifted relatively to one another and along their respective mounting pieces as necessary to permit adjustment of the angular disposition of conveyor 32.

The receiving end 34 of conveyor 32 is obliquely disposed with respect to the longitudinal axis of the latter so that end 34 normally extends substantially parallel to the axis of rotation of front drive wheels 14. Such is not absolutely essential, however, and end 34 may be other than parallel with such axis in certain situations depending upon the angular disposition of conveyor 32 and the width of header 18. Nominally, conveyor 32 will be disposed at approximately a 45° angle from the normal path of travel of implement 10 and the path of projection of crop from conditioning rolls 26 and 28, thus making end 34 generally parallel with the axis of wheels 14.

On the other hand, the discharge end 36 is substantially perpendicular to the longitudinal axis of conveyor 32 so that end 36 is obliquely disposed with respect to the path of travel of implement 10. An upright shield 76 rises from conveyor 32 along the back thereof and extends a sufficient distance upwardly to prevent any crop from accidentally leaving conveyor 32 along the back of the latter. The opposite stretch of conveyor 32 is open.

Conveyor 32 has an upper surface 78 that receives and supports the crop when it is thrown rearwardly onto conveyor 32 by the conditioning rolls 26 and 28. Surface 78 extends substantially the full length and width of conveyor 32 and is provided with a series of longitudinally extending, laterally spaced apart grooves 80 that complementally receive a number of endless drive belts 82, each of which is looped about its own sheave 84 at discharge end 36 and another sheave 86 at receiving end 34. Sheaves 84 are fixed to a common drive shaft 88 operated by a hydraulic motor 90 or the like, while each of the sheaves 86 is mounted for rotation on its own axle and is provided with means not shown for suitably tensioning its corresponding belt 82. Each belt 82 carries a number of crop engaging lugs 92 that project upwardly beyond the grooves 80 to move the crop toward discharge end 36 when belts 82 are actuated by motor 90. A series of upwardly inclined and down turned strippers 94 extend outwardly from the outermost terminus of surface 78 to assure that the crop is disengaged from lugs 92 as the latter move around sheaves 84.

A large deflector 96 extends across and above discharge end 36 slightly outwardly from the latter for controlling the distance that the crops are thrown off discharge end 36, thereby locating the position of the windrow. Deflector 96 is swingable about a generally horizontal axis at 98 and is yieldably biased toward a fully raised position by tension springs 100, in which raised position the crop will be most distantly thrown from discharge end 36. Suitable means such as a stiff control line 102 leads from deflector 96 to the operating cab (now shown) of implement 10 to enable the operator to change the position of deflector 96 along each pass across the field in order to properly position the windrow being formed. In and out adjustment of deflector 96 is provided by its telescopic mounts 104.

From the foregoing description, the operation of implement 10 with conveyor 32 attached should be apparent. As implement 10 advances across the field, the crop thereon, whether standing or previously mowed, is raised by header 18 and delivered to the conditioning rolls 26 and 28 which in turn project a stream of the crop rearwardly toward the receiving end 34 of conveyor 32. Much of the rearwardly projected crop is deflected downwardly by the cross deflector 30 onto and across conveyor 32 such that the crop is spread evenly upon the latter. Without interruption, the crop landing on conveyor 32 is immediately engaged by the obliquely moving lugs 92 and rapidly advanced toward discharge end 36. As lugs 92 round the sheaves 84, the crop is stripped therefrom by strippers 94 and projected with substantial velocity off discharge end 36 for redeposit into a windrow alongside the path of travel of implement 10.

In the production of the first of a pair of windrows in the double windrow, the deflector 96 is maintained in its lowered position by the operator such that the crop issuing from conveyor 32 is quickly directed downwardly to position the windrow just inside of the swath being taken by header 18. On the next successive pass across the field in the opposite direction to produce the second windrow, the operator maintains deflector 96 fully raised so that the crop issuing from conveyor 32 is propelled laterally a sufficient distance to land outside of the swath and on top of the previously formed windrow. Depending upon the moisture and density characteristics of the crop being windrowed, the deflector 96 may be located at other than its two extreme positions during the formation of the two windrows of a double windrow.

It is important to recognize that as the crop land on conveyor 32 adjacent receiving end 34, the crop is not forced to abruptly stop and then re-accelerate in order to move laterally toward discharge end 36. Instead, the rearward momentum of the crop, gained from the conditioning rolls 26 and 28, is substantially preserved by continuing to move the crop rearwardly at an oblique angle to its original direction of movement. Hence, the crop never stops once it leaves conditioning rolls 26 and 28. There is no opportunity for it to bunch up and collect as has heretofore been a problem with perpendicularly disposed cross conveyors, hence producing a smooth crop flow of uniform density issuing from discharge end 36. The windrow thus formed has the same characteristics of uniform density as the volume of crop issuing from conveyor 32, such that rapid and proper curing of the crop is encouraged.

It is also to be noted that the receiving end 34 of conveyor 32 is positioned but a short distance behind the conditioning rolls 26 and 28. Thus, the crop issuing from rolls 26 and 28 has but a short distance to travel before reaching conveyor 32, resulting in a minimum of crop loss within the space between rolls 26, 28 and receiving end 34.

The close proximity of receiving end 34 to rolls 26 and 28 is especially important when it is considered that the practice of double windrowing is most often carried out in light prairie grasses where it is necessary to combine two separate windrows in order to produce a single composite windrow of sufficient bulk to facilitate pickup of the composite windrow by subsequent equipment such as a stack forming machine. The light grasses are inherently more difficult to project because of their small mass and, thus, where the space between end 34 and rolls 26, 28 is substantial, crop loss can be significant. Old perpendicular cross conveyors required positioning behind wheels 14 such that the space through which the crop had to be projected from rolls 26, 28 was substantially greater than the small space made possible with the obliquely disposed conveyor 32.

The design of the conveyor 32 itself is of special benefit because this allows the crop to be fed laterally at a faster speed than heretofore possible with draper-type cross conveyors. Where flexible conveying webs were utilized, such webs would tend to flap violently at higher operating speeds, thereby limiting the velocity at which the crop was propelled from such old conveyors and, perhaps more importantly, limiting the speed of advancement of the implement across the field.

In the present invention, the stationary surface 78 provides the necessary support for the crop to prevent its premature gravitation to the ground, while the rapidly moving lugs 92 on belts 82 provide the necessary moving force for feeding the crop off discharge end 36. By locating belts 82 within complemental grooves 80, belts 82 can be driven at relatively high speeds without malfunction, thereby increasing the overall speed at which implement 10 may operate and imparting greater velocity and momentum to the crop as it issues from discharge end 36. Such increased velocity and momentum assures that the crop can be thrown a sufficient distance during the second pass of a double windrow formation to deposit the second windrow on top of the first rather than spaced a distance beside the latter, thereby facilitating subsequent pickup by other handling equipment.

Having thus described the invention what is claimed as new and desired to be secured by Letters Patent is:

1. In a double windrowing method, the steps of: raising a swath of crop from a field while advancing thereacross in one direction;
   reducing the width of the raised swath to form a narrower row of crop;
   projecting the row of crop rearwardly generally parallel with the path of advancement;
   transferring the projected crop obliquely of said path of advancement to one side of the latter without discontinuing the rearward momentum of the crop;
   depositing the crop on the field within the lateral boundries of said swath of crop to produce a windrow alongside said path of advancement; and
   repeating said raising, reducing, projecting, transferring and depositing steps while advancing across the field in the opposite direction to produce a second windrow associated with the first.

2. In a double windrowing method as claimed in claim 1, wherein the crop is projected rearwardly through space.

3. In a double windrowing method as claimed in claim 1, wherein the crop is deflected downwardly as it is being projected rearwardly.

4. In a double windrowing method as claimed in claim 1, wherein the crop is disposed upon and moved along a supporting surface during said transferring step.

5. In a double windrowing method as claimed in claim 4, wherein the crop is projected rearwardly through space onto said surface.

6. In a double windrowing method as claimed in claim 5, wherein the crop is deflected downwardly onto and spread across said surface as it is being projected rearwardly.

7. A double windrowing method including the steps of: raising a crop from a field while advancing in one direction thereacross;
   conditioning the raised crop to accelerate curing of the latter;
   projecting the conditioned crop rearwardly through space from the point of conditioning in a direction generally parallel with the path of advancement;
   catching the projected crop upon a moving surface;
   transferring all of the crop at a uniform rate of travel in only one direction obliquely relative to said path of advancement without discontinuing the rearward momentum of the crop;

depositing the crop on the field to produce a windrow alongside the path of advancement; and repeating the foregoing steps while advancing across the field in the opposite direction to produce a second windrow associated with the first.

8. A double windrowing method as claimed in claim 7, wherein the conditioned crop is deflected downwardly as it is being projected rearwardly.

9. A double windrowing method as claimed in claim 7, wherein said raising step includes lifting a swath of crop from the field and said depositing step includes placing the crop on the ground within the lateral boundaries of said swath.

* * * * *